United States Patent [19]

Kato

[11] Patent Number: 4,768,089
[45] Date of Patent: Aug. 30, 1988

[54] ENDOSCOPIC SYSTEM

[75] Inventor: Haruo Kato, Kuroiso, Japan

[73] Assignee: Kabushiki Kaisha Toshiba, Kawasaki, Japan

[21] Appl. No.: 100,413

[22] Filed: Sep. 24, 1987

[30] Foreign Application Priority Data

Sep. 25, 1986 [JP] Japan .................. 61-224933

[51] Int. Cl.⁴ ........................ A61B 1/04; A61B 1/06
[52] U.S. Cl. ....................................... 358/98; 128/6; 358/1; 358/80
[58] Field of Search .................. 358/98, 1, 27, 28, 29, 358/80; 128/4–11

[56] References Cited

U.S. PATENT DOCUMENTS 4,633,303 12/1986 Nagasaki ............................. 358/98
4,716,457 12/1987 Matsuo ................................ 358/98
4,719,508 1/1988 Sasaki .................................. 358/98

Primary Examiner—Howard W. Britton
Attorney, Agent, or Firm—Foley & Lardner, Schwartz, Jeffery, Schwaab, Mack, Blumenthal & Evans

[57] ABSTRACT

In an endoscopic system, whenever signals obtained by a CCD camera are recorded through a decoder in an R (red) image memory, a G (green) image memory and a B (blue) image memory which constitute frame memories, data of R, G and B images are computed and converted by a converter into data of hue, saturation and intensity images which are stored in a hue image memory, a saturation image memory and an intensity image memory respectively. A masking and color-modulating unit carries out, based on modulating function data corresponding to a fluorescent contrast medium to be used, a coloring process on hue image data stored in the hue image memory so that a morbid portion may be distinguished by color on a display unit, or executes a color enhancement process by masking to leave a specific color and to make other colors achromatic. The hue image data which have been subjected to the coloring process and stored in the hue image memory, the saturation image data in the saturation image memory and the intensity image data in the intensity image memory are converted into R, G and B image data by the converter. The R, G and B image data are again stored in the R, G and B image memories and then displayed.

6 Claims, 4 Drawing Sheets

ENDOSCOPIC SYSTEM

BACKGROUND OF THE INVENTION

1. Field of the Invention

The present invention relates to an endoscopic system for displaying a color image on a display screen by using data of three primary color images, and particularly to an endoscopic system suitable for observing the state of an object to be photographed which is changing due to a contrast medium.

2. Description of the Prior Art

Usually, to observe a morbid portion such as a portion affected by cancer in an internal organ such as a stomach of a patient by using an endoscopic system, a fluorescent contrast medium is firstly injected into a vein of the patient. After that, a physician observes the cancer portion on a display screen of the endoscopic system to qualitatively inspect with his eyes the amount of blood vessels collecting at the cancer portion.

However, in the prior art endoscopic system, the cancer portion is displayed on the screen as an unclear image thereof because changes in the color of blood vessels after injecting the fluorescent contrast medium into the vein of the patient are so slight to catch. Therefore, it is usually difficult for the physician to correctly diagnose the cancer portion whose color is changing due to the fluorescent contrast medium.

As described in the above, the prior art endoscopic system does not provide on the display a clear image of the cancer portion whose color is changed by the fluorescent contrast medium, and it is difficult with such a prior art endoscopic system to correctly diagnose the degree of progress of the cancer portion.

In addition, the prior art system requires the physician to memorize time when the fluorescent contrast medium has been injected into the vein of the patient, or it requires the physician to actuate a stopwatch simultaneously with the injection. In this way, the physician is forced to do bothersome work with the prior art system.

SUMMARY OF THE INVENTION

In considering the above situations, an object of the present invention is to provide an endoscopic system which is capable of easyly handling and clearly displaying the state of a morbid portion whose color changes under the effect of a contrast medium.

In order to accomplish the object, an endoscopic system according to the present invention comprises an image converting means. The image converting means receives data of three primary color images obtained by photographing an object whose state is changing under the effect of a contrast medium, and converts the data into three color property spaces, or, hue, saturation and intensity, as well as regenerating data of three color property spaces so converted. The endoscopic system of the present invention further comprises a color modulating means. Whenever the image converting means provides the data of three color property spaces, the color modulating means enhance is constructed to the color characteristic of an image of the data of three color property spaces according to modulating function data, and supplies the processed data of three color property spaces to the image converting means.

The endoscopic system of the present invention has the image converting means and the color modulating means as its essential parts to use data of three primary color images, or, R (red), G (green) and B (blue) images to display a color image on a display screen to show the state of a morbid portion whose color is changing due to the contrast medium.

Namely, the image converting means receives video signals including data of three primary color images obtained by photographing an object whose state is changing due to the contrast medium, converts the data of three primary color images into hue, saturation and intensity spaces, and sends the converted signals to the color modulating means.

The color modulating means enhances a color characteristic of an image on the three color property spaces according to modulating function data corresponding to the contrast medium, and sends the enhanced data of three color property spaces back to the image converting means.

Accordingly, the data of three color property spaces to be regenerated by the image converting means are enhanced in their color characteristic by the color modulating means. After the data of three primary color images are regenerated from the data of three color property spaces by the image converting means, the regenerated three primary color image signals are supplied to a display unit to clearly display the state of a morbid portion which is changing under the effect of the contrast medium.

BRIEF DESCRIPTION OF THE DRAWINGS

These and other objects, features and advantages of the present invention will become apparent from the following descriptions of preferred embodiments taken in conjunction with the accompanying drawings in which.

DETAILED DESCRIPTION OF THE PREFERRED EMBODIMENTS

Figure 1:
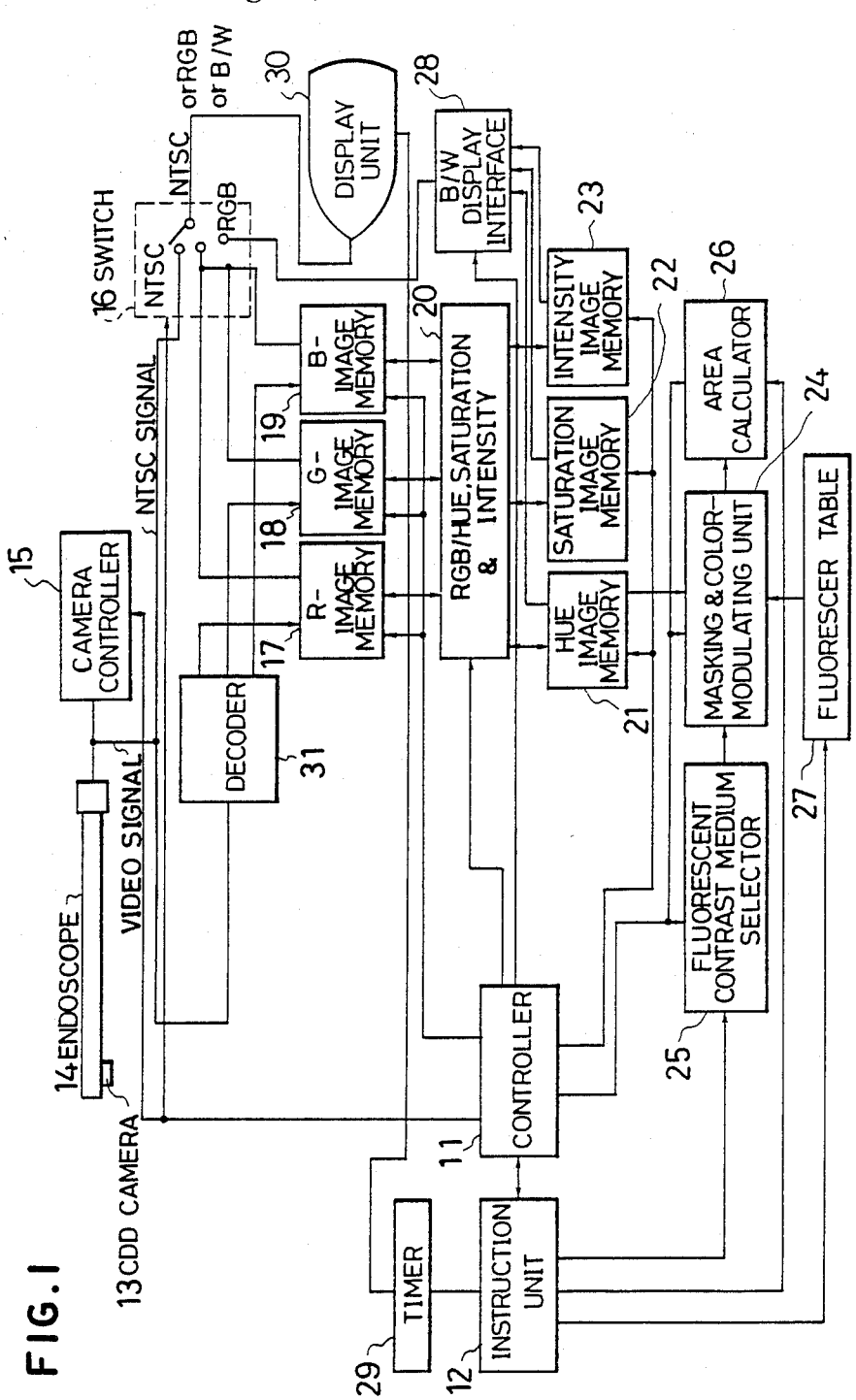
FIG. 1 is a block diagram of an endoscopic system embodying the present invention.

FIG. 1 is a block diagram of an endoscopic system according to a first embodiment of the present invention.

The endoscopic system of this embodiment has a controller 11. The controller 11 is connected to an instruction unit 12, a camera controller 15 for controlling a CCD camera 13 mounted on an endoscope 14, a switch 16, an R (red) image memory 17, a G (green) image memory 18, a B (blue) image memory 19, an RGB/hue, saturation and intensity converter 20, a hue image memory 21, a saturation image memory 22, an intensity image memory 23, a masking and color-modulating unit 24, a fluorescent contrast medium selector 25, an area calculator 26, and a black-and-white (B/W) display interface 28. A fluorescer table 27 for storing modulating function data is connected to the instruction unit 12 and to the masking and color-modulating unit 24. A timer 29 is connected to the instruction unit 12. Between the camera controller 15 and the R, G and B image memories 17, 18 and 19, there is connected a decoder 31. A display unit 30 is connected to the R, G and B image memories 17, 18 and 19, etc.

With such an arrangement, a system including the R image memory 17, G image memory 18, B image memory 19, converter 20, hue image memory 21, saturation image memory 22, intensity image memory 23 and the controller 11 acts as an image converting means.

Therefore, whenever signals obtained by the CCD camera 13 are stored through the decoder 31 in the R image memory 17, G image memory 18 and B image memory 19 which constitute frame memories respectively, the R, G and B image data are converted by the converter 20 into data of a hue image, a saturation image and an intensity image and are stored in the hue image memory 21, saturation image memory 22 and intensity image memory 23, respectively.

Whenever the data of three color property images are obtained, the masking and color-modulating unit 24 acts as a color modulating means.

Namely, the masking and color-modulating unit 24 carries out a color enhancing process of the hue image data stored in the hue image memory 21 as will be described later in detail (based on modulating function data (hue range data, coloring data, coloring signals, etc.) corresponding to the fluorescent contrast medium to be used) so that a morbid portion may be distinguished by color on the display unit 30.

The selection of the modulating function data is carried out by the fluorescent contrast selector 25 in response to an input operation for designating the fluorescent contrast medium to the instruction unit 12.

The hue image data which have been subjected to the color enhancing process and stored in the hue image memory 21, the saturation image data stored in the saturation image memory 22 and the intensity image data in the intensity image memory 23 are converted into R, G and B image data by the converter 20. The R, G and B image data are again stored in the R, G and B image memories 17, 18 and 19 and then displayed.

Figure 3:
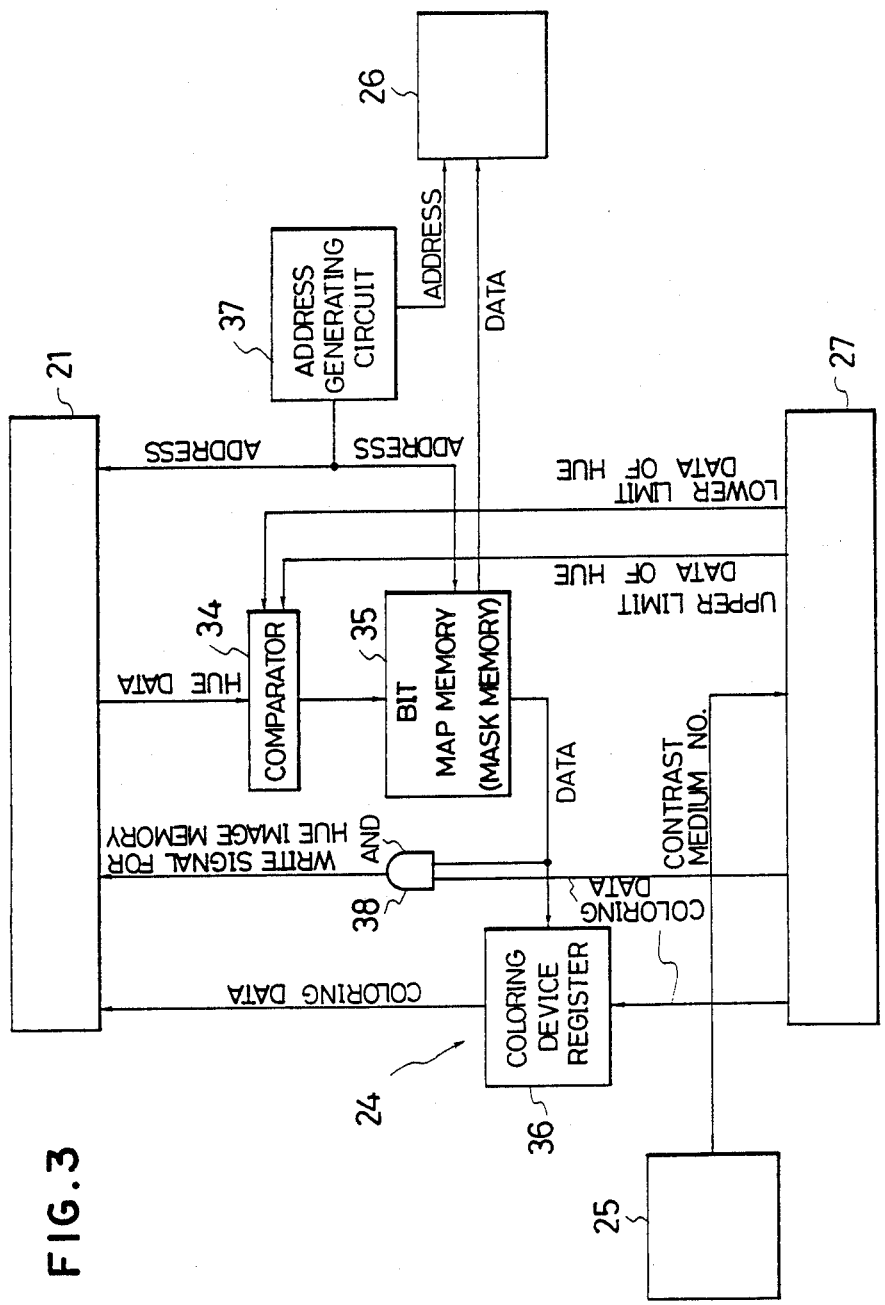
FIG. 3 is a block diagram showing the details of a masking and color-modulating unit shown in FIG. 1.

With reference to FIG. 3, the details of the masking and color-modulating unit 24 will be described.

As shown in FIG. 3, the masking and color-modulating unit 24 comprises a comparator 34 for receiving hue range data (an upper limit data and a lower limit data) from the fluorescer table 27 and comparing them with hue data from the hue image memory 21; a bit map memory 35 for storing a result of the comparison from the comparator 34; and a coloring device register 36 for holding coloring data from the fluorescer table 27 and supplying the coloring data to the hue image memory 21 according to the contents of the bit map memory 35. The color modulating unit 24 further comprises an address generating circuit 37 for generating reading/writing addresses for the bit map memory 35 and the hue image memory 21; and an AND gate 38 for supplying write signals for the hue image memory 21 according to data from the bit map memory 35 and coloring signals from the fluorescer table 27.

With the above-mentioned arrangement, supposing that Fluorescite injection No. 1 is used as a fluorescent contrast medium to be injected into a vein of a patient. When the fluorescent contrast medium reaches to a morbid portion such as a cancer portion, changes in color of the fluorescent contrast medium are appeared in the range of 127° to 129° of hue angle among the hue image data. Therefore, in this case, according to an instruction from the fluorescent contrast medium selector 25, a lower limit hue angle of 127° and an upper limit hue angle of 129° are applied from the fluorescer table 27 to the comparator 34. The comparator 34 supplies an output "1" to the bit map memory 35 when a hue image data from the hue image memory 21 is within a range between the upper and lower limits (127° to 129°), and an output "0" when it is out of the range. The bit map memory 35 stores the outputs from the comparator 34. Then, the bit map memory 35 is scanned, and, for every stored content of "1", the coloring device register 36 supplies a coloring data (for instance, a hue angle of 128°) to the hue image memory 21 into which the data is written. Namely, when one hue image data in the hue image memory 21 is within the above mentioned hue data range, a corresponding hue image data in the hue image memory 21 is enhanced by the coloring data.

Therefore, a color which changes according to the fluorescent contrast medium is enhanced and displayed on the display unit 30.

In addition, the area calculator 26 calculates an area of the morbid portion whose color changes on the display unit 30 due to the fluorescent contrast medium. The area calculator 26 is constructed to count the number of signals of "1" in the bit map memory 35 of the color modulating unit 24 to calculate the area. A result of the calculation may be displayed on the display unit 30.

Further, according to this embodiment, a known means (not shown) may be adopted to measure a distance between a tip of the endoscopic and the stomach wall, and, based on a result of the measurement, the controller 11 will find a screen magnification due to a lens system to store the screen magnification in a built-in memory (not shown).

The black-and-white (B/W) interface 28 makes an image on the screen of the display unit 30 be displayed as a black-and-white image, as and when required.

The video signals obtained by the CCD camera 13 may not only be supplied to the frame memories but also be supplied as NTSC signals to the display unit 30 through the switch 16.

In addition, in synchronous with the movement of an injection cylinder when the fluorescent contrast medium is injected into the vein of the patient, or when a physician pushes an injection starting button (not shown), the timer 29 will be activated through the instruction unit 12 so that an elapsed time may be displayed on the display unit 30.

An overall operation of the embodiment will be explained.

Supposing that there is a cancer-like morbid portion in the stomach of a patient, and that the morbid portion is observed on the display unit 30.

When the instruction unit 12 provides an instruction that the Fluorescite injection No. 1 is used as a fluorescent contrast medium to the fluorescent contrast medium selector 25, the fluorescent contrast medium selector 25 is activated such that the masking and color-modulating unit 24 receives a hue angle range of 127° to 129° from the fluorescer table 27.

When the hue angle range of 127° to 129° is set in the masking and color-modulating unit 24, it will be in a standby state, and a message that the fluorescent contrast medium may be injected into a vein of the patient is displayed on the display unit 30.

Figure 2:
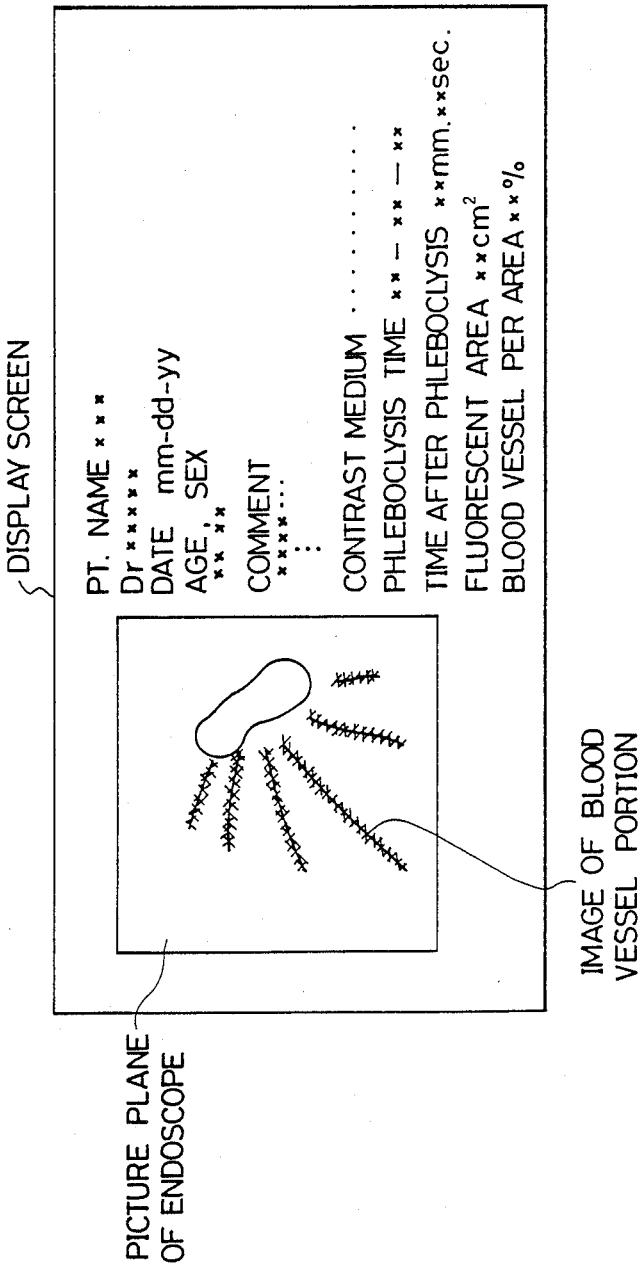
FIG. 2 is a view showing an example of an image on a display screen according to the embodiment shown in FIG. 1.

After seeing the message for starting the injection, a physician may inject the Fluorescite injection No. 1 into the vein of the patient. Simultaneously, the timer 29 is activated by the instruction unit 12, and necessary information such as an elapsed time after the injection which is changing, is displayed real-time on the display unit 30 together with an image of the morbid portion of the patient, as shown in FIG. 2.

Due to the Fluorescite injection, if the morbid portion is an early cancer, the color of blood vessels in which blood is flowing, around the early cancer gradually changes with elapsed times of 30 seconds, 1 minute, 2 minutes and 4 minutes to yellowish red different from other portions due to the fluorescence of fluorescein.

Photographed data of the portion which has different color from the other portions due to the fluorescence are converted into data of three property spaces of hue, saturation and intensity by the converter 20, then the data in the hue image memory 21 are processed by the masking and color-modulating unit 24 to enhance the color of the blood vessels changed by the Fluorescite injection No. 1, as mentioned in the above.

In addition, an area of the color changed portion after a predetermined time, for instance, four minutes after the injection of the fluorescent contrast medium into the vein of the patient will be calculated by the area calculator 26 as mentioned in the above to display a value corresponding to a blood vessel concentration per area on the display 30.

According to this embodiment, the cancer portion and a peripheral area thereof with their color changing states due to the fluorescent contrast medium are clearly displayed on the display unit 30 together with elapsed time as well as a size of the color changing area. Therefore, the degree of progress, etc., of the cancer portion can correctly be diagnosed.

Although only a hue image has been subjected to the color enhancing process in this embodiment, it is possible to add a process for making a saturation image have the maximum value (1.0) or to provide a structural filter for an intensity image. In this case, a blood vessel portion on the display screen will further be vivid, and an image of the blood vessel portion clearer.

Figure 4:
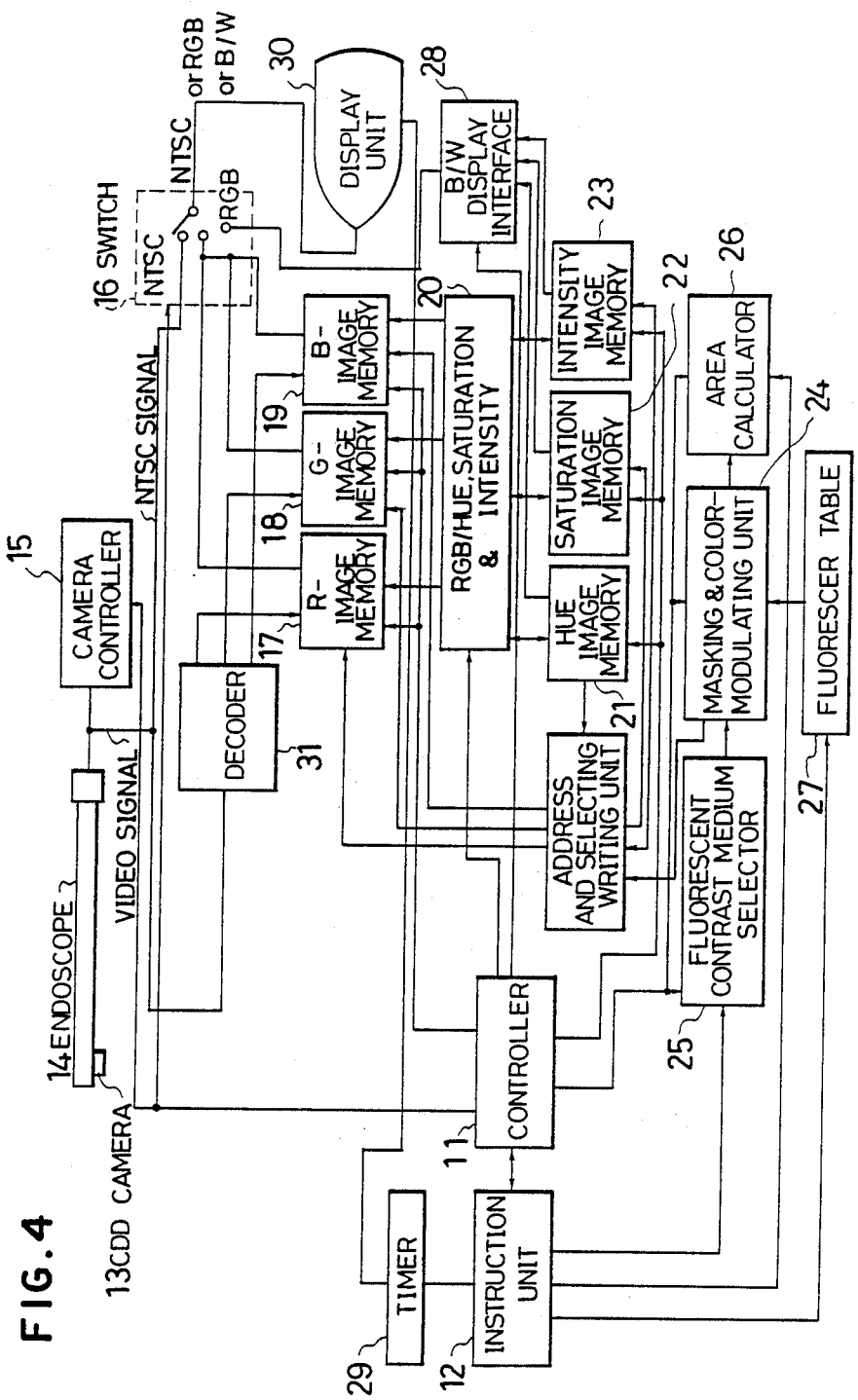
FIG. 4 is a block diagram of a second embodiment of an endoscopic system according to the present invention.

A second embodiment of the present invention will be described with reference to FIG. 4.

In the first embodiment explained in the above, the masking and color-modulating unit 24 has been used to enhance the hue of hue image data in the hue image memory 21. According to the second embodiment, the hue enhancing process will be carried out by processing R, G and B image data stored in the R, G and B image memories 17, 18 and 19 respectively. Namely, the second embodiment further comprises, in addition to the circuit shown in FIG. 1, an address selecting and writing unit 33 for receiving hue enhancing signals from the masking and color-modulating unit 24, and supplying address signals and rewriting signals, which correspond to the signals from the masking and color-modulating unit 24, to the R, G and B image memories 17, 18 and 19. Other construction and operation of the second embodiment are the same as those of the first embodiment, and therefore the explanation thereof will be omitted.

As described in the above, an endoscopic system according to the present invention will be ready for carrying out a color enhancement process on the characteristics of images of morbid and peripheral portions only by designating a contrast medium to be used before photographing an object whose state is changing due to the contrast medium. After the completion of the enhancement, the morbid and peripheral portions will vividly be displayed to improve the diagnostic capacity of a physician.

Various modifications will become possible for those skilled in the art after receiving the teachings of the present disclosure without departing from the scope thereof.

What is claimed is:

1. An endoscopic system for photographing and displaying an object having a portion whose color is changed by a contrast medium injected in the object on a display unit, comprising:

photographing means for photographing the object having the color changed portion, and for outputting data of three primary color images of said object;

image converting means for converting the data of three primary color images from said photographing means into data of three property spaces of hue, saturation and intensity, and for regenerating data of three primary color images from the data of three property spaces;

supplying means for supplying modulating function data corresponding to the injected contrast medium; and color modulating means for carrying out an enhancement process on the data of three property spaces converted by said image converting means, according to the modulating function data from said supplying means so as to enhance a color of the color changed portion of said object, said data of three property spaces so enhanced being regenerated as data of three primary color images by said image converting means and supplied to the display unit.

2. An endoscopic system as claimed in claim 1, wherein the enhancement process executed by said color modulating means is enhancement process of a hue of the color changed portion.

3. An endoscopic system as claimed in claim 1, wherein said image converting means comprises:

an R (red) image memory, a G (green) image memory and a B (blue) image memory for storing the data of three primary color images respectively and for supplying the data to the display unit;

a hue image memory, a saturation image memory and an intensity image memory for storing the data of three property spaces respectively;

a converter for converting the data of three primary color images from the R, G and B image memories into the data of three property spaces and for regenerating data of three primary color images from the data of three property spaces from the hue, saturation and intensity image memories; and a controlling means for controlling the operation of the converter.

4. An endoscopic system as claimed in claim 3, wherein said supplying means comprises a fluorescer table for storing the modulating function data for a plurality of contrast media and a fluorescent contrast medium selector for outputting an instruction signal which is for selecting and supplying modulating function data corresponding to a contrast medium to be used from the fluorescer table, and said color modulating means comprises a color modulator for processing the data of three primary images stored in the R, G and B image memories respectively according to the modulating function data from the fluorescer table such that a hue of the color changed portion of said object is changed to have a hue which is easy to judge by an operator, and an address selecting and writing unit for outputting address signals and rewriting signals to the R, G and B image memories.

5. An endoscopic system as claimed in claim 3, wherein said supplying means comprises a fluorescer table for storing the modulating function data for a plurality of contrast medium and a fluorescent contrast medium selector for outputting an instruction signal which is for selecting and supplying modulating function data corresponding to a contrast medium to be used from the fluorescer table, and said color modulating means comprises a color modulator for processing hue image data in the hue image memory according to the modulating function data from the fluorescer table such that a hue of the color changed portion of the object is changed to have a hue which is easy to judge by an operator.

6. An endoscopic system as claimed in claim 5, wherein the modulating function data from the fluorescer table have at least hue range data corresponding to a color to be changed by the contrast medium and coloring data, and said color modulator performs an enhancement process on hue image data stored in the hue image memory according to the coloring data when the hue image data in the hue image memory are within the hue range.

* * * * *